United States Patent
Eckstein et al.

(10) Patent No.: US 10,106,086 B1
(45) Date of Patent: Oct. 23, 2018

(54) PILLAR MOUNTED ASSIST STEP

(71) Applicant: GM GLOBAL TECHNOLOGY OPERATIONS LLC, Detroit, MI (US)

(72) Inventors: Joseph N. Eckstein, Saint Clair Shores, MI (US); Eric A. Watterworth, Orion, MI (US); James Logan, Jr., South Lyon, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/478,619

(22) Filed: Apr. 4, 2017

(51) Int. Cl.
| | |
|---|---|
| *B60R 3/02* | (2006.01) |
| *B62D 25/04* | (2006.01) |
| *B60R 3/00* | (2006.01) |

(52) U.S. Cl.
CPC ............... *B60R 3/005* (2013.01); *B60R 3/02* (2013.01); *B62D 25/04* (2013.01)

(58) Field of Classification Search
CPC .......... B60R 3/00; B60R 3/002; B60R 3/005; B60R 3/007; B60R 3/02; B61D 23/02; B62D 25/04
See application file for complete search history.

(56) References Cited

U.S. PATENT DOCUMENTS

| | | | | |
|---|---|---|---|---|
| 1,467,976 A | * | 9/1923 | Gannon | B60R 3/02 |
| | | | | 280/166 |
| 1,953,298 A | * | 4/1934 | Goodwin | B61D 23/02 |
| | | | | 105/1.3 |
| 2,807,476 A | * | 9/1957 | Newell | B60R 3/02 |
| | | | | 182/91 |
| 3,171,671 A | * | 3/1965 | Cornett | B60R 3/00 |
| | | | | 182/91 |
| 3,784,227 A | * | 1/1974 | Rogge | B60R 3/02 |
| | | | | 280/166 |
| 3,907,357 A | * | 9/1975 | Davis, Jr. | B60R 3/00 |
| | | | | 280/164.1 |
| 5,046,582 A | * | 9/1991 | Albrecht | B60R 3/02 |
| | | | | 182/127 |
| 5,342,073 A | * | 8/1994 | Poole | B60R 3/02 |
| | | | | 105/449 |
| 6,139,094 A | * | 10/2000 | Teply | B62D 23/005 |
| | | | | 296/203.03 |
| 6,315,353 B1 | * | 11/2001 | Brodt | B62D 25/02 |
| | | | | 296/203.03 |
| 6,460,915 B1 | * | 10/2002 | Bedi | B60J 5/0498 |
| | | | | 296/151 |
| 9,126,535 B1 | * | 9/2015 | Moore | B60R 3/00 |
| 2003/0127285 A1 | * | 7/2003 | Claeys | B60R 3/005 |
| | | | | 182/127 |

* cited by examiner

*Primary Examiner* — Frank B Vanaman
(74) *Attorney, Agent, or Firm* — Cantor Colburn LLP

(57) ABSTRACT

A structure for a vehicle includes a lower frame member and an upper frame member. A pillar extends from the lower frame member to the upper frame member and a step is carried by the pillar between the lower frame member and upper frame member.

15 Claims, 6 Drawing Sheets

PILLAR MOUNTED ASSIST STEP

INTRODUCTION

The subject invention relates to a step assembly for assisting individuals in reaching the roof of a vehicle to, for instance, store and retrieve items. In particular the invention relates to a step assembly which may be integrated in the body of a vehicle for accessing the roof of the vehicle.

Passenger vehicles have evolved into multiple faceted utility vehicles. Such vehicles transport large families on trips requiring large amounts of luggage, or are utilized for transporting outdoor equipment such as bicycles, kayaks, canoes and the like. In many circumstances the roof of the vehicle is utilized as a storage platform. Due to the height of some vehicles, in some instances over six feet high, positioning items onto the rooftop may be difficult due to the cumbersome efforts required in elevating heavy objects into position. Accordingly, it is desirable to provide an assist step to facilitate access to the roof of a vehicle for positioning and retrieving items stored thereon.

SUMMARY

In one exemplary embodiment a structure for a vehicle comprises a lower frame member, an upper frame member and a pillar extending from the lower frame member to the upper frame member. A step assembly is carried by the pillar between the lower frame member and upper frame member.

In addition to one or more of the features described, or as an alternative, further embodiments could include wherein the step assembly is integrally formed with the pillar.

In addition to one or more of the features described, or as an alternative, further embodiments could include wherein the pillar is the C-pillar.

In addition to one or more of the features described, or as an alternative, further embodiments could include wherein the C-pillar includes a recess and the step assembly is disposed within the recess.

In addition to one or more of the features described, or as an alternative, further embodiments could include wherein the C-pillar forms part of a vehicle wheel well having an interior and the recess extends into the wheel well.

In addition to one or more of the features described, or as an alternative, further embodiments could include wherein the vehicle includes a door opening defined by at least two pillars and the step assembly is disposed within the door opening.

In addition to one or more of the features described, or as an alternative, further embodiments could further comprise a vehicle door, the door comprising a recess for receiving the step assembly when the door of the vehicle is in a closed position within the door opening.

In addition to one or more of the features described, or as an alternative, further embodiments could include wherein the pillar has an interior and the step assembly includes a stowed position within the interior of the pillar, and a deployed position within the door opening.

In addition to one or more of the features described, or as an alternative, further embodiments could include wherein the pillar includes an opening, into which the step assembly is located when moved from the deployed position within the door opening to the stowed position.

In addition to one or more of the features described, or as an alternative, further embodiments could include wherein the step assembly includes a hinge having an axis about which the step assembly rotates when moving from a deployed position to the stowed position.

In addition to one or more of the features described, or as an alternative, further embodiments could include wherein the hinge axis extends at an angle to a plane defined by a passenger compartment floor.

In addition to one or more of the features described, or as an alternative, further embodiments could include wherein the step assembly is pivotable into the stowed position through engagement of the door with an outer edge portion of the tread.

In addition to one or more of the features described, or as an alternative, further embodiments could include wherein the outer edge portion of the tread is inwardly angled.

In another exemplary embodiment a structure for a vehicle comprises a lower frame member, an upper frame member, a C-pillar extending from the lower frame member to the upper frame member and a step assembly disposed integrally with the C-pillar.

In addition to one or more of the features described, or as an alternative, further embodiments could include wherein the vehicle includes a door opening defined by a B-pillar and C-pillar and the step assembly is disposed within the door opening.

In addition to one or more of the features described, or as an alternative, further embodiments could include wherein the C-pillar forms part of a vehicle wheel well and the step assembly extends into a portion thereof.

In yet another exemplary embodiment a structure for a vehicle comprises a lower frame member, an upper frame member and a pillar extending from the lower frame member to the upper frame member and defining an interior therein. A step assembly is integrated with the pillar between the lower frame member and upper frame member. The step assembly has a stowed position within the interior of the pillar, and a deployed position wherein the step assembly is disposed within a door opening defined by the pillar.

In addition to one or more of the features described, or as an alternative, further embodiments could include wherein the pillar includes an opening into which the step assembly is moved from the stowed position within the interior of the pillar to the deployed position wherein the step is disposed within the door opening.

In addition to one or more of the features described, or as an alternative, further embodiments could include In addition to one or more of the features described, or as an alternative, further embodiments could include wherein the step assembly includes a hinge having an axis about which the step assembly rotates when moving from the deployed position to the stowed position.

In addition to one or more of the features described, or as an alternative, further embodiments could include In addition to one or more of the features described, or as an alternative, further embodiments could include wherein the hinge axis extends at an angle to a plane defined by a passenger compartment floor.

The above features and advantages, and other features and advantages, are readily apparent from the following detailed description when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DETAILED DESCRIPTION

Figure 1:
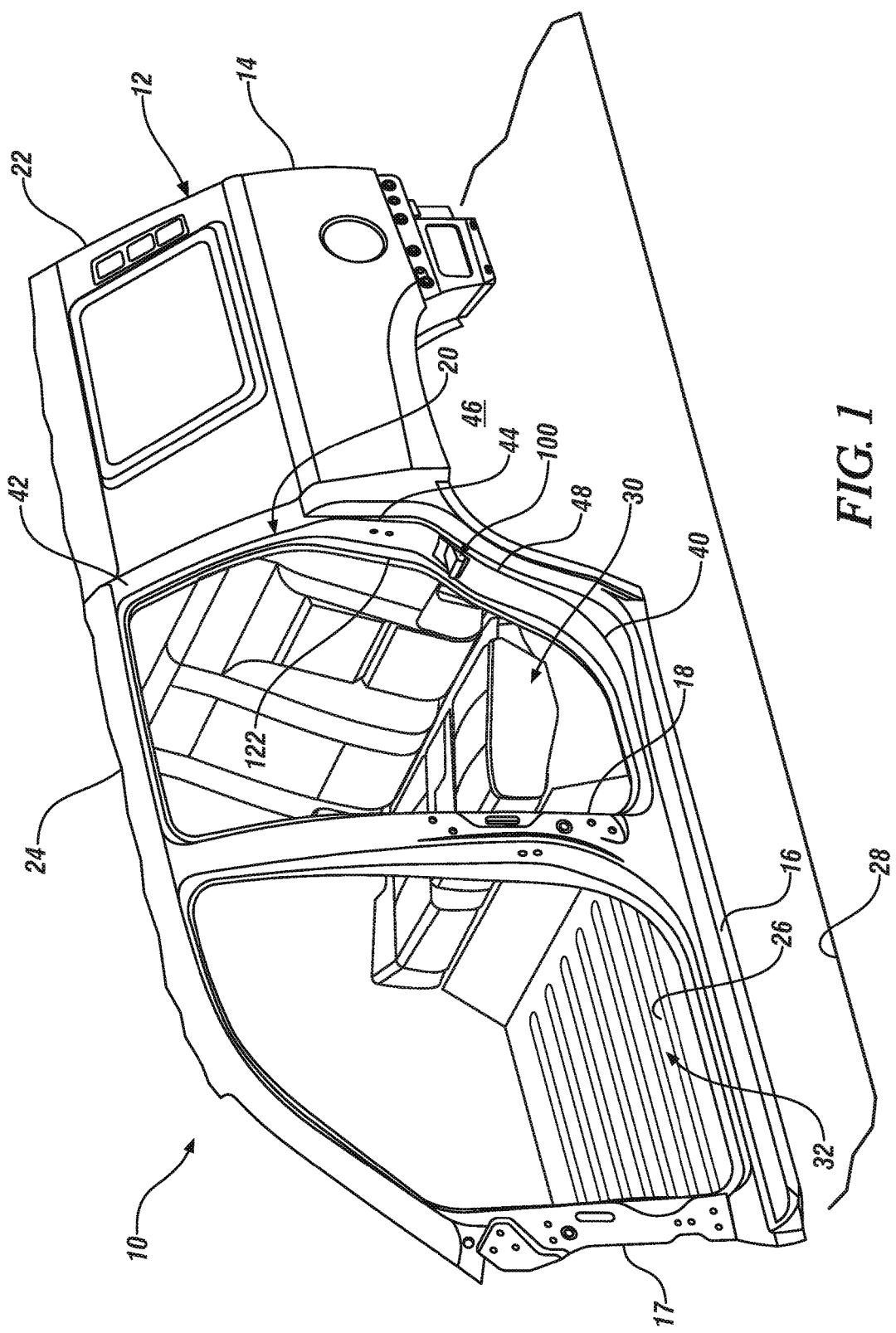
FIG. 1 is a side view of a vehicle structure illustrating a portion of a motor vehicle structure embodying the current disclosure.

The following description is merely exemplary in nature and is not intended to limit the present disclosure, its application or uses. It should be understood that throughout the drawings, corresponding reference numerals indicate like or corresponding parts and features.

In accordance with an exemplary embodiment as shown in FIG. 1, a vehicle 10 includes a vehicle body structure 12 which includes a left side body structure 14 including a lower frame member 16, an A-pillar 17, a B-pillar 18, a C-pillar 20, a D-pillar 22, an upper frame member 24 and a passenger compartment floor 26 defining a plane that extends generally parallel with the ground 28. The respective A, B and C pillars extend from lower frame member 16 to upper frame member 24. In certain embodiments upper frame member 24 may support a roof panel (not shown). The centrally located B-pillar and C-pillar cooperate to define a rear door opening 30 and the B-pillar and front located A-pillar are cooperate to define a front door opening 32.

The C-pillar 20 may have three sections along its general length, a lower section 40 generally integrated with lower frame member 16, an upper section 42 generally integrated with upper frame member 24, and an intermediate portion 44 having a generally curved profile extending downward from the upper section 42 to the lower section 40. In certain embodiments, the intermediate portion 44 has a profile transitioning from a vertical orientation to one having a distinctly curved orientation that defines a portion of wheel well 46.

Figure 2:
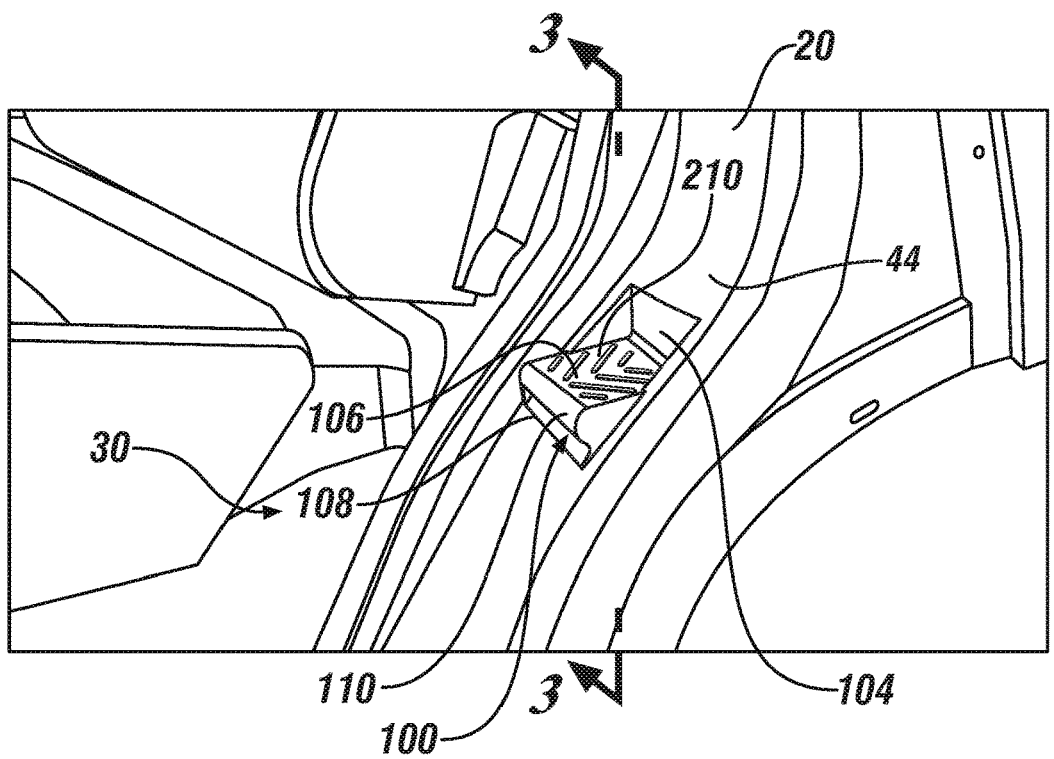
FIG. 2 is a close-up view of a static step disposed in a pillar of a vehicle, according to one embodiment.
Figure 3:
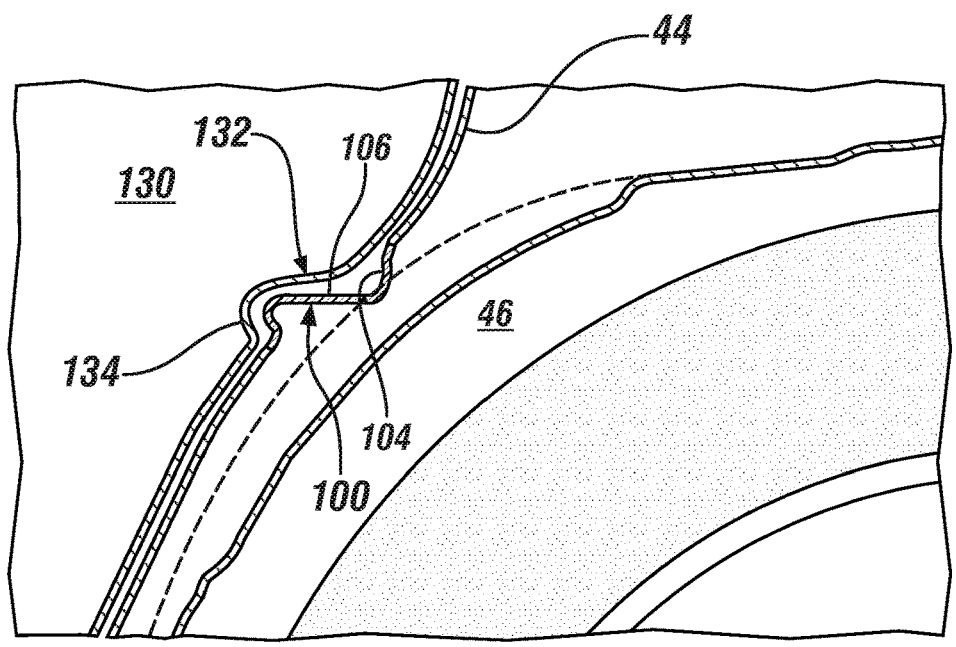
FIG. 3 is a sectional view of the static step of FIG. 2 taken along line 3-3 of FIG. 2.

As shown in detail in FIGS. 2 and 3, a step assembly 100 is carried by a respective pillar between the lower frame member 16 and the upper frame member 24. In the embodiment shown, step assembly 100 is carried by the C-pillar 20. In an exemplary embodiment, step assembly 100 may be a static step integrally formed with the C-pillar. In this embodiment a recess 104 is formed within the profile of C-pillar 20 and the step assembly 100 is carried within the recess. In an embodiment, recess 104 is formed within the section of the intermediate portion 44 which defines a portion of wheel well 46. Step assembly 100 includes a horizontal portion or a tread 106. The tread 106 includes a predetermined horizontal area to thereby establish a stable surface for receiving a person's foot or a handle for a child in stepping into the vehicle. The surface of tread 106 is preferably of an uneven contour, or includes a non-slip surface, to facilitate traction between an individual's foot or shoe and the step assembly 100. In certain embodiments, as shown in FIG. 3, step 100 extends into a portion of wheel well 46.

Figure 4:
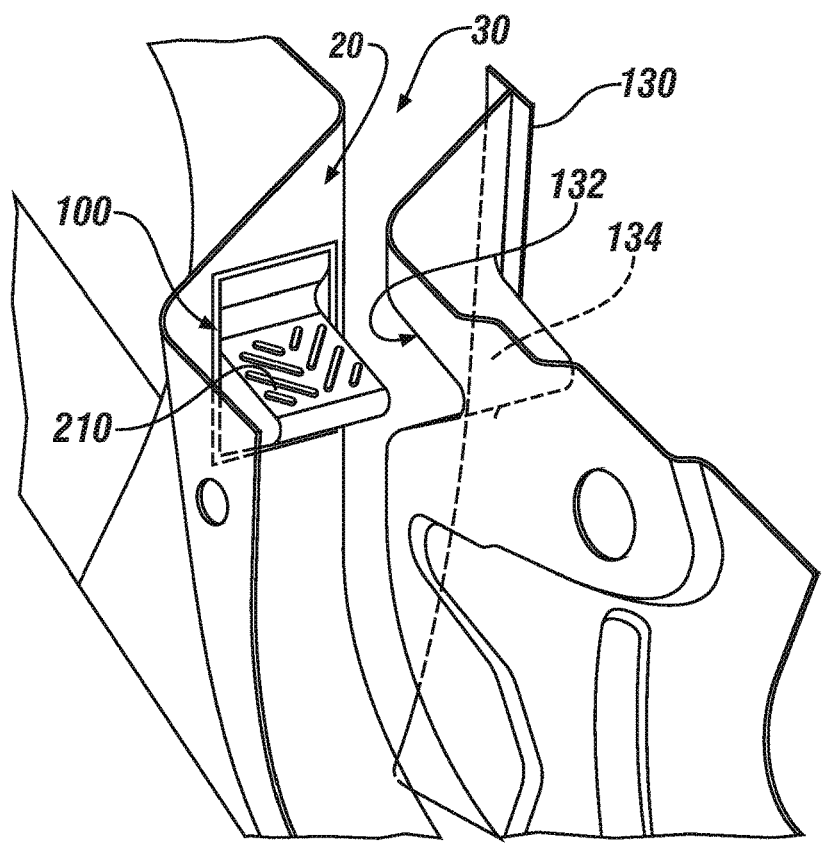
FIG. 4 is a close-up view of a static step disposed in the pillar of a vehicle and a door adaptively configured for closing according to an embodiment.

In the embodiment illustrated, step 100 may be positioned within door opening 30. A door 130, FIGS. 3 and 4, preferably contains a profile 132 for receiving step assembly 100 as the door is closed. Profile 132 includes a recess 134 for receiving step assembly 100 therein (i.e. providing clearance for the step when the door is closed). In this manner door 130 may close in a sealed engagement with C-pillar 20 such that step assembly 100 is positioned within the recess 134 of door 130.

Figure 5:
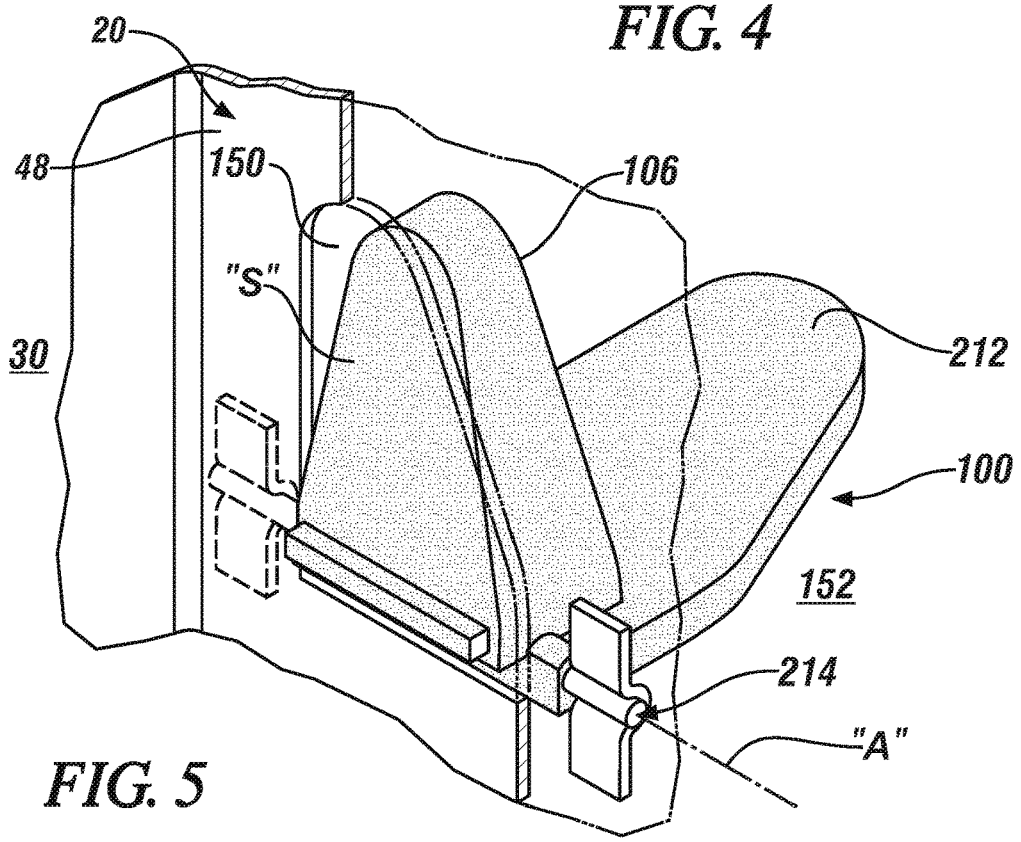
FIG. 5 illustrates a rear, inner view of deployable step assembly disposed in a pillar of a vehicle in a deployed position, according to another embodiment.
Figure 6:
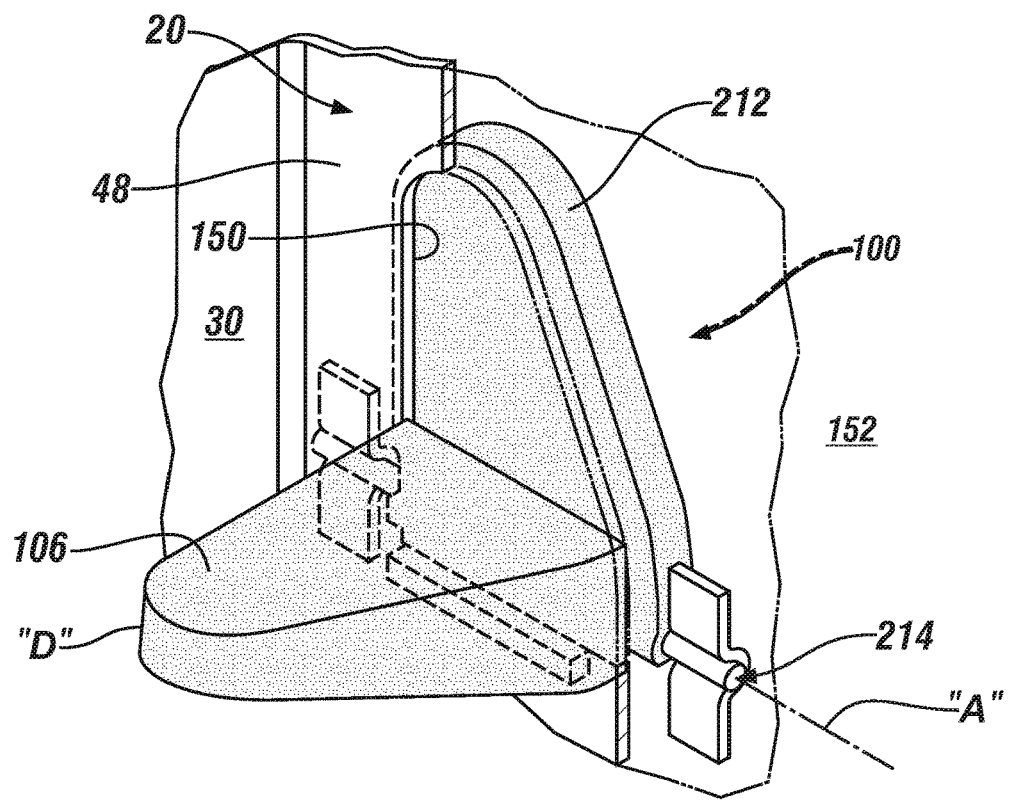
FIG. 6 illustrates a front, outer view of the deployable step assembly of FIG. 5 in a deployed position.

FIGS. 5 through 8, illustrate another embodiment of step assembly 100 that comprises a deployable tread 106 which may be moved from a recessed, non-deployed, or stowed position "S" shown in FIG. 5, to a deployed position "D" shown in FIG. 6. As illustrated, in the deployed position "D" the tread 106 of step assembly 100 extends outwardly from the C-pillar 20 and into door opening 30. Tread 106 preferably includes a contoured surface 210, FIG. 4. Step assembly 100 may further include a rear portion 212 which extends at an angle to the tread 106. In an exemplary embodiment, the rear portion 212 may extend at a normal angle to the tread 106. The tread 106 of the step assembly 100 extends through an opening 150 which is formed in the intermediate portion 44 of the C-pillar 20. A hinge assembly 214 enables step 100 to rotate from a stored position "S" to a deployed position "D", FIG. 7.

Figure 7:
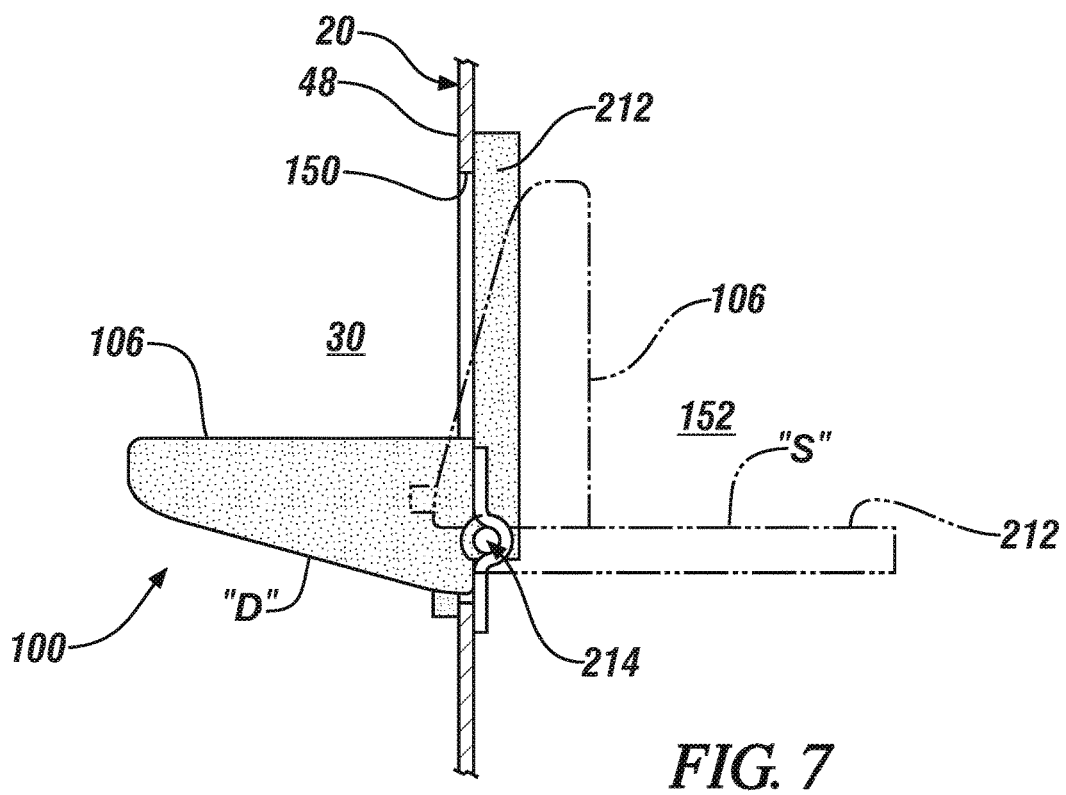
FIG. 7 illustrates a sectional view of a vehicle door having a deployable step assembly taken along Line 7-7 of FIG. 6.
Figure 8:
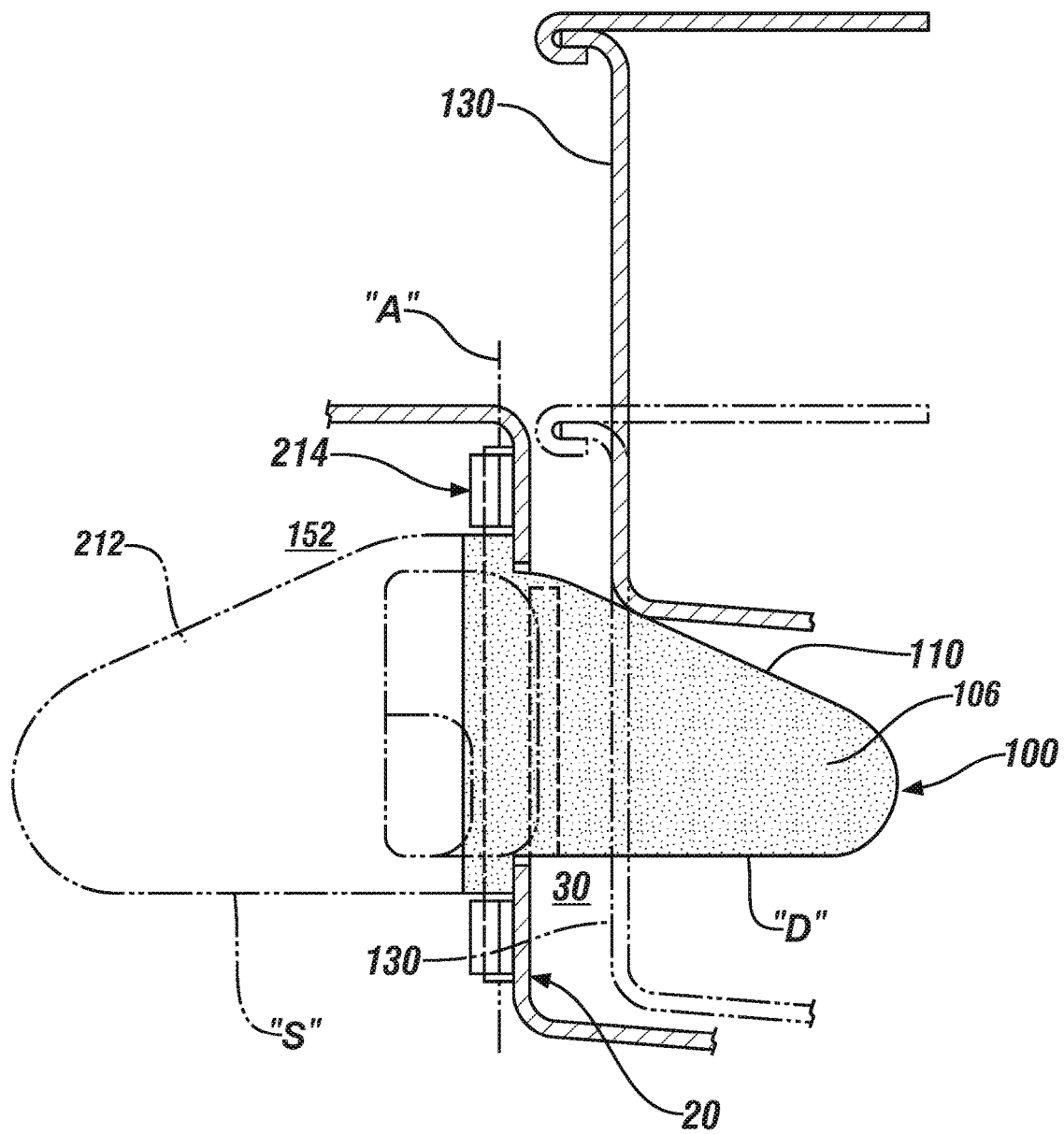
FIG. 8 illustrates a sectional view of a vehicle door having a deployable step assembly taken along Line 8-8 of FIG. 6.

As shown in FIGS. 5, 7 and 8, step assembly 100 may be rotated about the axis "A" of the hinge 214 to move the tread 106 into the interior 152 of the C-pillar 20 when not in use and to allow closure of the door 130. When stowed, the tread 106 fully occupies opening 150 to prevent ingress of dirt and moisture to the interior 152 of C-pillar 20. In an exemplary embodiment, the weight of the rear portion 212 maintains tread 106 of the step assembly 100 in the stowed position. It is contemplated that a biasing member such as a hinge spring may be added to the step assembly to assist in moving the tread 106 into a stowed position "S".

As best illustrated in FIGS. 7 and 8, when tread 106 of the step assembly 100 is deployed, forward pivoting motion about the axis "A" of pivot hinge 214 is preferably stopped by rear portion 212 engaging pillar 20. Other means for stopping the movement of the step may be utilized including biases and/or detents. In one preferred embodiment, step assembly 100 is constructed to support a weight of approximately 300 pounds.

As shown in FIG. 8, in an exemplary embodiment, should the step assembly 100 remain in the deployed position "D" upon closing of door 130 the tread 106 may include an inwardly angled outer edge portion 110 that is configured to contact the closing door. Due to the angle of the outer edge portion 110, the force of the door 130 thereon will urge the tread 106 to rotate about the axis "A" of the hinge assembly 214 and into the stowed "S" position within the C-pillar 20.

Figure 9:
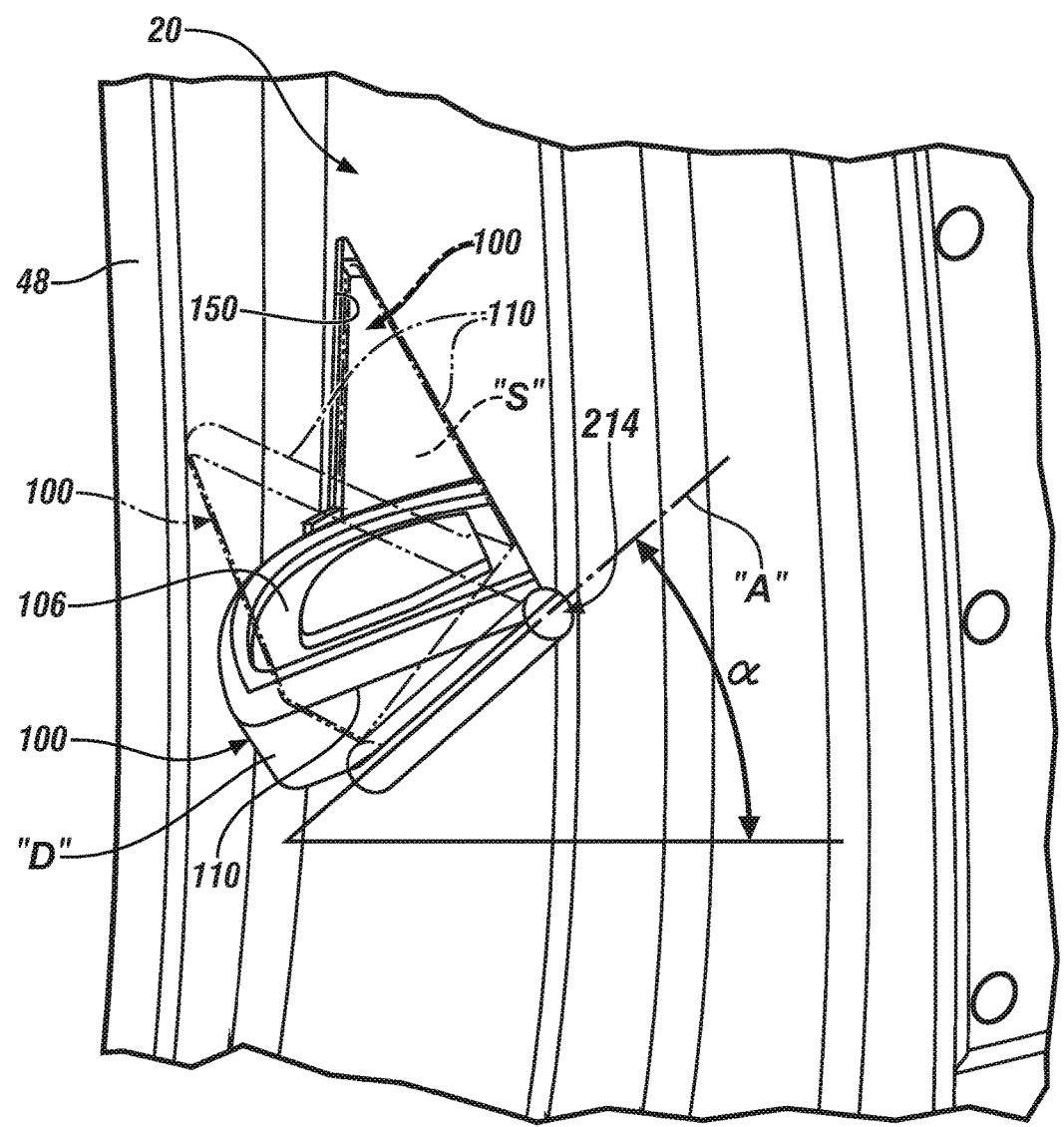
FIG. 9 illustrates a front, outer view of a deployable step assembly according to another embodiment.

As shown in FIG. 9, in another exemplary embodiment, to facilitate the rotation of the step assembly 100 about the axis "A" of the hinge assembly 214, the assembly may be mounted to the C-pillar such that the axis "A" extends at an angle "a" to the passenger compartment floor 26. The force of the closing door 130 on the step assembly 100 will urge the tread 106 to rotate about the axis "A" of the hinge assembly 214 and into the stowed position "S" within the C-pillar 20.

An advantageous construction of a step assembly within a pillar of a vehicle may be had according to the disclosure. The step assembly is carried by a pillar at a height which enables a person to be positioned upon, and have access to, the roof of the vehicle. The step may be either static or dynamic (i.e. having a stowed and deployed position). In embodiments, the step cooperates with a door enabling the door to be closed in a normal manner. This cooperation may exist either through a matingly constructed profile with the door for receiving a step, or the door may facilitate the stowing of a dynamic step.

While the disclosure has been described with reference to exemplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the essential scope thereof. Therefore, it is intended that the disclosure not be limited to the particular embodiments disclosed, but that it will include all embodiments falling within the scope of the application.

What is claimed is:

1. A structure for a vehicle comprising:
   a lower frame member;
   an upper frame member;
   a first pillar and a second pillar extending from the lower frame member to the upper frame member, the pillars defining a door opening;
   a step assembly disposed within the door opening and carried by at least one of the first and second pillars between the lower frame member and upper frame member; and
   a vehicle door comprising a recess for receiving the step assembly when the vehicle door is in a closed position within the door opening.

2. The structure of claim 1, wherein the step assembly is integrally formed with at least one of the first and second pillars.

3. The structure of claim 1, wherein the second pillar is a C-pillar.

4. The structure of claim 3, wherein the C-pillar includes a recess and the step assembly is disposed within the recess.

5. The structure of claim 4, wherein the C-pillar forms part of a vehicle wheel well having an interior and the recess extends into the wheel well.

6. The structure of claim 1, wherein at least one of the first and second pillars has an interior and the step assembly includes a stowed position within an interior of at least one of the first and second pillars, and a deployed position within the door opening.

7. The structure of claim 6, wherein at least one of the first and second pillars includes an opening, into which the step assembly is located when moved from the deployed position within the door opening to the stowed position.

8. The structure of claim 6, wherein the step assembly includes a hinge having an axis about which the step assembly rotates when moving from a deployed position to the stowed position.

9. The structure of claim 8, wherein the hinge axis extends at an angle to a plane defined by a passenger compartment floor.

10. The structure of claim 8, wherein the step assembly is pivotable into the stowed position through engagement of the door with an outer edge portion of a tread of the step assembly.

11. The structure of claim 10, wherein the outer edge portion of the tread is inwardly angled.

12. A structure for a vehicle comprising:
    a lower frame member;
    an upper frame member;
    a pillar extending from the lower frame member to the upper frame member and defining an interior therein, and
    a step assembly integrated with the pillar between the lower frame member and upper frame member, the step assembly having a stowed position within the interior of the pillar, and a deployed position wherein the step assembly is disposed within a door opening defined by the pillar.

13. The structure of claim 12, wherein the pillar includes an opening into which the step assembly is moved from the stowed position within the interior of the pillar to the deployed position wherein the step is disposed within the door opening.

14. The structure of claim 13, wherein the step assembly includes a hinge having an axis about which the step assembly rotates when moving from the deployed position to the stowed position.

15. The structure of claim 14, wherein the hinge axis extends at an angle to a plane defined by a passenger compartment floor.

* * * * *